(12) United States Patent
Richards

(10) Patent No.: US 7,120,185 B1
(45) Date of Patent: Oct. 10, 2006

(54) METHOD AND APPARATUS FOR WASTE VITRIFICATION

(75) Inventor: Ray S. Richards, Sylvania, OH (US)

(73) Assignee: Stir-Melter, Inc, Perrysburg, OH (US)

( * ) Notice: Subject to any disclaimer, the term of this patent is extended or adjusted under 35 U.S.C. 154(b) by 1826 days.

(21) Appl. No.: 07/785,776

(22) Filed: Oct. 31, 1991

Related U.S. Application Data

(62) Division of application No. 07/510,556, filed on Apr. 18, 1990.

(51) Int. Cl.
*C03B 5/027* (2006.01)

(52) U.S. Cl. .............................. 373/41; 373/27; 373/29; 373/36; 373/39; 422/159; 422/903; 252/629

(58) Field of Classification Search .......... 423/DIG. 20; 422/159, 903; 252/629; 373/27, 29, 39, 41, 373/36; 588/11
See application file for complete search history.

(56) References Cited

U.S. PATENT DOCUMENTS

| | | | | |
|---|---|---|---|---|
| 2,749,379 | A | * | 6/1956 | Geffcken et al. ............. 373/39 |
| 2,781,411 | A | * | 2/1957 | Geffcken et al. ............. 373/29 |
| 3,020,324 | A | | 2/1962 | Curtis |
| 3,350,187 | A | | 10/1967 | Brichard et al. |
| 3,358,066 | A | | 12/1967 | Tiede et al. |
| 3,585,268 | A | | 6/1971 | Monks et al. |
| 3,754,886 | A | * | 8/1973 | Richards et al. ............. 65/134 |
| 3,819,350 | A | * | 6/1974 | Pellett et al. ................. 65/134 |
| 3,850,606 | A | * | 11/1974 | Rough ........................ 65/178 |
| 3,942,968 | A | * | 3/1976 | Pieper ........................ 65/134 |
| 3,988,138 | A | * | 10/1976 | Rough ........................ 65/134 |
| 4,139,360 | A | | 2/1979 | Piper |
| 4,161,617 | A | * | 7/1979 | Hrycik et al. ..................... 13/6 |
| 4,299,611 | A | | 11/1981 | Penberthy |
| 4,366,571 | A | | 12/1982 | Palmquist |
| 4,424,149 | A | | 1/1984 | Bege et al. |
| 4,528,011 | A | | 7/1985 | Macedo et al. |
| 4,627,069 | A | * | 12/1986 | Harvey et al. ................ 373/29 |
| 4,632,689 | A | | 12/1986 | De Willigen et al. |

(Continued)

FOREIGN PATENT DOCUMENTS

| | | |
|---|---|---|
| JP | 49-75616 | 7/1974 |
| JP | 60-78397 | 5/1985 |
| JP | 64-50999 | 2/1989 |

OTHER PUBLICATIONS

Richards, R.S., "Rapid Melting and Refining Systems", Ceramic Bulletin, vol. 67, No. 11, 1988, pp. 1806–1809.*

Sombret, C.G., Melters and Furnace Equipment Used for Radioactive Waste Conditioning Proceedings of the 1987 Int'l Waste Management Conference, pp. 259–263.*

Richards et al., Small High–Speed Glass Melter for Waste Vitrification, paper 3–5XIV–90.*

*Primary Examiner*—Ngoclan T. Mai
(74) *Attorney, Agent, or Firm*—Brooks Kushman P.C.

(57) ABSTRACT

A waste vitrification apparatus (10) having rotatable mixer impeller (16) functioning as a shaft electrode (60) and metallic vessel (14) functioning as a vessel electrode (62). A stream (12) of waste material and vitrifiable material are mixed and melted in the vessel (14) for vitrification. The waste vitrification method converts a feed stream (12) by mixing the feed stream into a glass melt (13) and melting glass batch of the feed stream (12) to form a foamy mass. The stream is dispersed by the impeller (16) to form a foam which is then densified in a settling zone (22), recovered through a spout (24) and solidified in storage containers. Means are provided to adjust the location of the mixing impeller (16) in the vessel (14) to change the depth of the settling zone (22). The impeller (16) is mounted on a drive shaft (18) having a recirculating coolant flow.

4 Claims, 3 Drawing Sheets

U.S. PATENT DOCUMENTS

| | | |
|---|---|---|
| 4,632,690 A | 12/1986 | Colwell, Jr. et al. |
| 4,635,570 A | 1/1987 | Ewest et al. |
| 4,710,266 A | 12/1987 | Hayashi et al. |
| 4,725,383 A | 2/1988 | Hayashi et al. |
| 4,782,497 A * | 11/1988 | Sasaki et al. ............ 373/29 |
| 4,793,933 A | 12/1988 | Rostoker et al. |
| 4,797,232 A | 1/1989 | Aubert |
| 4,847,008 A | 7/1989 | Boatner et al. |
| 4,855,082 A | 8/1989 | Duivelaar |
| 4,895,678 A * | 1/1990 | Ohtsuka et al. ............ 252/632 |
| 4,906,409 A | 3/1990 | Leister |
| 4,943,395 A | 7/1990 | Sasaki et al. |
| 5,304,701 A * | 4/1994 | Igarashi ............ 588/201 |

\* cited by examiner

METHOD AND APPARATUS FOR WASTE VITRIFICATION

This is a divisional of co-pending application Ser. No. 07/510,556 filed on Apr. 18, 1990.

TECHNICAL FIELD

The present invention relates to a method and apparatus for vitrifying wastes. More particularly, the resent invention relates to a glass melting furnace having an impeller to mix and foam vitrifiable materials and waste materials which are fed to the melter, melted and recovered to form a solid vitrified mass.

BACKGROUND ART

Disposal of hazardous waste is a pressing environmental problem. Hazardous waste such as radioactive materials from nuclear reactors have long term radioactivity which makes conventional methods of solid waste disposal inappropriate. There is significant danger of such materials leaching from a solid waste disposal facility and entering the water supply.

Vitrification of hazardous solid wastes has been proposed and implemented on a relatively small scale. Problems associated with vitrification processes developed previously include low throughput resulting in a high disposal cost per unit of hazardous waste material. As used herein, radioactive wastes, hazardous wastes and toxic chemical waste shall be referred to as "hazardous waste".

The United States Department of Energy, working in conjunction with six other countries in a cooperative technical exchange, has developed a method of vitrifying radioactive waste material in boro-silicate glass. The U.S. Department of Energy project resulted in the development of an electric glass furnace. The glass furnace developed was electrically powered and operated on an aqueous waste stream having 40 percent solids content. The solids in the waste stream were approximately 60 percent boro-silicate glass frit and 40 percent radioactive waste sludge. A primary problem with the resultant static glass furnace was that its output was limited to a rate of 4 pounds of vitrified waste per hour per square foot of furnace surface area.

Boro-silicate glass was selected for its chemical durability and low melting point. The special boro-silicate glass combines with the waste material to form a vitrified output that will be referred to herein as "waste glass".

The furnace included the use of Inconel 690 as electrodes and other parts of the furnace. (Inconel is a trademark of International Nickel Corporation).

In addition to the low throughput of the electric furnace, the cost of melters developed in the cooperative project was considerable. In addition, start-up and shut-down procedures require considerable time.

Soda lime glass melters having a mixing element and electrical heating have been developed for the purpose of improving productivity of soda lime glass manufacturing processes. An example of such a melter is disclosed in U.S. Pat. No. 3,850,606 to Rough and U.S. Pat. No. 3,819,350 to Pellett, et al.

Such melters were tried by Owens-Illinois but were abandoned due to the inability of the melters to produce high quality glass having an acceptable level of gaseous occlusions. The intended electrical flow path in the melters was between the electrodes extending upwardly from the floor of the melter and the mixing element. This general arrangement resulted in problems including high electrical charge concentration at the tips of the impeller which resulted in excessive wear and consumption of the impeller. Further, high volume waste processing is adversely effected by the use of components which must be replaced.

These and other problems are overcome by the glass vitrification melter of the present invention as summarized below.

DISCLOSURE OF INVENTION

The present invention relates to a waste vitrification method performed in a vessel having a rotatable impeller. The process comprises the steps of introducing a feed stream into the vessel. The feed stream is then mixed into a glass melt in the vessel by the impeller to form a foamy mass. The glass melt is electrically heated in the vessel by application of electrical energy between the sides of the vessel and the impeller to melt the glass batch material and form a molten vitrified output. Finally, the molten vitrified output is recovered from the vessel.

The method may also include the step of densifying the foam material by passing the foam material into a quiescent zone where the foam material is separated into a densified material and gaseous materials.

The mixing and heating steps are preferably performed simultaneously in a mixing zone in the vessel. Heating is diminished through the densifying step while maintaining the residual heat in the densified material to keep it in a pourable state until after the recovery step.

The quiescent zone may be in the same vessel as the mixing zone or, alternatively, the quiescent zone may be a separate vessel. If the quiescent zone is a separate vessel, the mixing zone and quiescent zone would be in fluid flow communication so that the foam material may pass by fluid flow from the mixing zone to the quiescent zone.

According to another aspect of the present invention, an apparatus for waste vitrification is disclosed. The waste vitrification apparatus vitrifies an aqueous stream having vitrifiable materials and waste materials to be disposed of in a suspension. The waste vitrification apparatus comprises a vessel formed of an electrically conductive material in which a mixing impeller is disposed which is also formed of an electrically conductive material. A drive shaft extends into the vessel and is connected to the mixing impeller. Means for rotating the drive shaft and impeller are provided for dispersing the constituents of the waste stream into the glass melt in the vessel. An electrical power circuit supplies sufficient voltage and current between the vessel and the impeller sufficient to heat the waste stream until the vitrifiable material melts to a liquid state and forms a solidifiable output including the waste material and the melted vitrifiable material. The apparatus includes an opening through which the solidifiable output is poured into a container for cooling and solidification.

The vessel preferably has a mixing zone located above a settling zone. As the aqueous stream is fed into the apparatus, it is mixed by the impeller and simultaneously heated by the electrical current between the impeller and the walls of the vessel. As the materials are mixed and heated, water in the system is vaporized and other constituents release gases resulting in the creation of a foamed mass. As the process proceeds, the foam mass moves by gravity into a settling zone located below the mixing zone within the vessel where a portion of the gaseous material contained in the foam mass is eliminated leaving a densified solidifiable output.

According to one aspect of the invention, the drive shaft and impeller are positionable at various heights within the vessel. The mixing impeller may then be positionable at various heights within the container to control the density of the solidifiable output. While it is not necessary to completely eliminate gaseous occlusions in the solidifiable output, an acceptable density level would be 70 percent and preferably more than 90 percent of the true density of the waste glass.

It is an object of the present invention to provide a high throughput hazardous waste vitrifying method and apparatus which quickly melts vitrifiable batch materials.

Another object of the present invention is to provide a waste vitrification method and apparatus which is capable of converting an aqueous, 40 percent solid feed stock, including 60 percent boro-silicate glass batch and 40 percent wastes and produce a dense vitrified solidifiable output.

It is another object of the present invention to provide a small waste vitrification apparatus which can be constructed as a portable or local hazardous waste processing unit.

It is another object of the present invention to provide a waste vitrification apparatus suitable for continuous or intermittent use depending on waste processing demands.

These and other objects of the present invention are achieved by the method and apparatus of the present invention as will be more fully understood upon review of the attached drawings in light of the following description of the best mode for carrying out the invention.

BEST MODE FOR CARRYING OUT THE INVENTION

Figure 1:
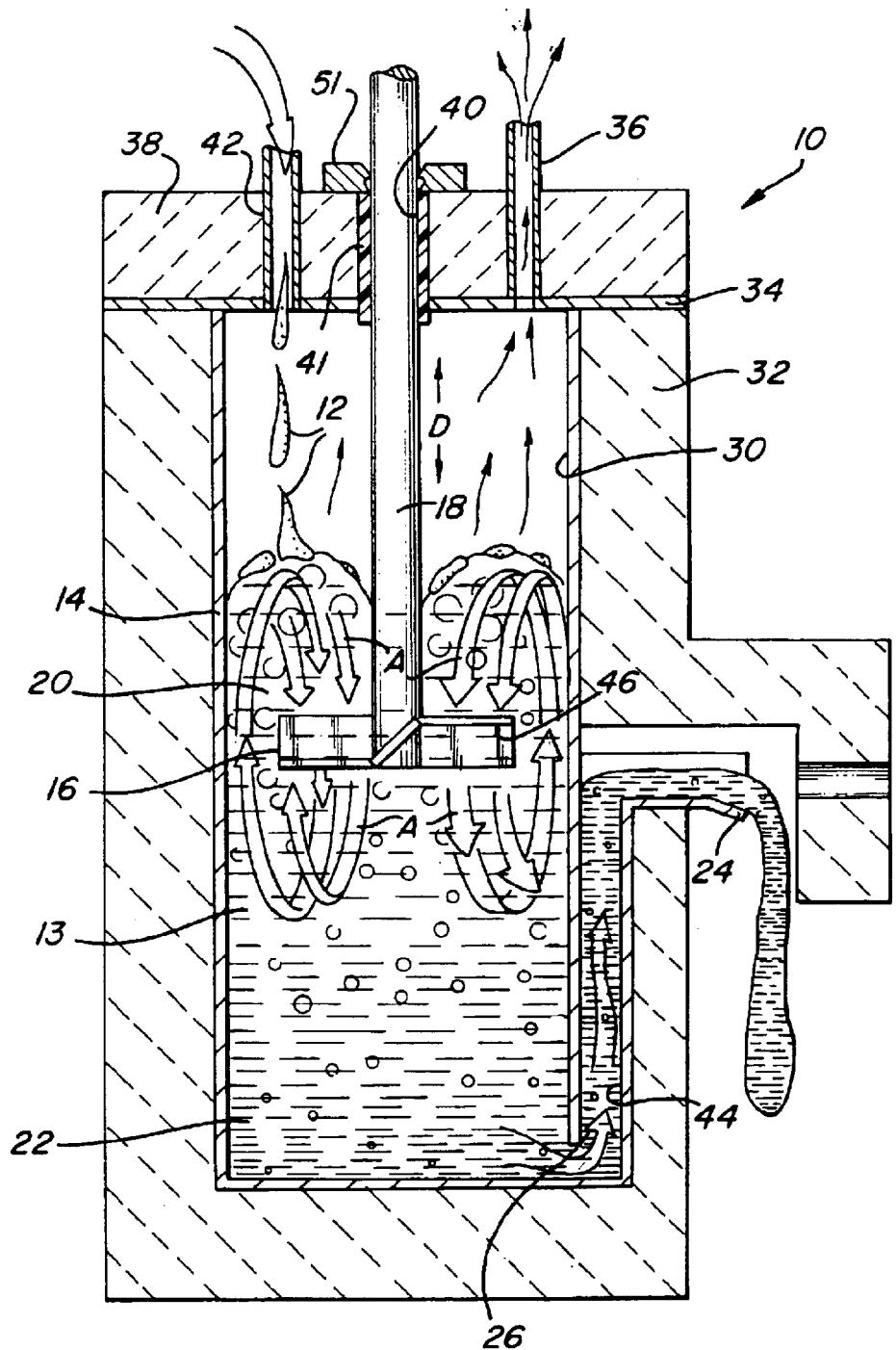
FIG. 1 is a cross-sectional schematic view of the glass melting apparatus according to the present invention.

Referring now to FIG. 1, the waste vitrification apparatus 10 of the present invention is shown receiving a feed stream 12 preferably comprising an aqueous slurry of glass batch and waste materials. The feed stream 12 could also be dry glass batch or melted glass batch and waste materials fed into the apparatus 10. The glass batch is preferably boro-silicate batch selected for its low melting point in the range of 950° C. to 1050° C. Other compositions may be used depending upon the thermal and chemical limitations of the vessel. As used herein, the term glass batch is intended to encompass both raw materials for making glass and fused and partially fused materials used in making glass known as frit or cullet. The wastes to be disposed of are either radioactive wastes, hazardous chemical wastes, or other wastes which require a durable disposal medium.

A vessel 14 is provided to receive the feed stream 12 in a glass melt 13. A mixing impeller 16 is disposed in the vessel 14 on a drive shaft 18. The vessel 14 is preferably formed of an electrically conductive, high temperature nickel alloy such as Inconel 690 (Inconel is a trademark of International Nickel Corporation). The mixing impeller and drive shaft 18 are also preferably formed of Inconel 690. Other suitable high temperature, electrically conductive materials, such as molybdenum, platinum or other high temperature alloys can be used depending on the materials processed.

A mixing zone 20 is defined in the upper portion of the vessel 14. A settling zone 22 is provided below the mixing zone 20 in the vessel 14. Alternatively, a settling zone 22 could be provided in a separate vessel (not shown) in fluid communication with the mixing zone 20 of the vessel 14.

A spout 24 of the "tea pot" type is preferably provided on the vessel 14 for pouring off the output of the waste vitrification apparatus 10. An opening 26 is formed in the vessel 14 at the base of the settling zone 22. The output is recovered through the opening 26 and passed in a molten state to the spout 24.

Figure 2:
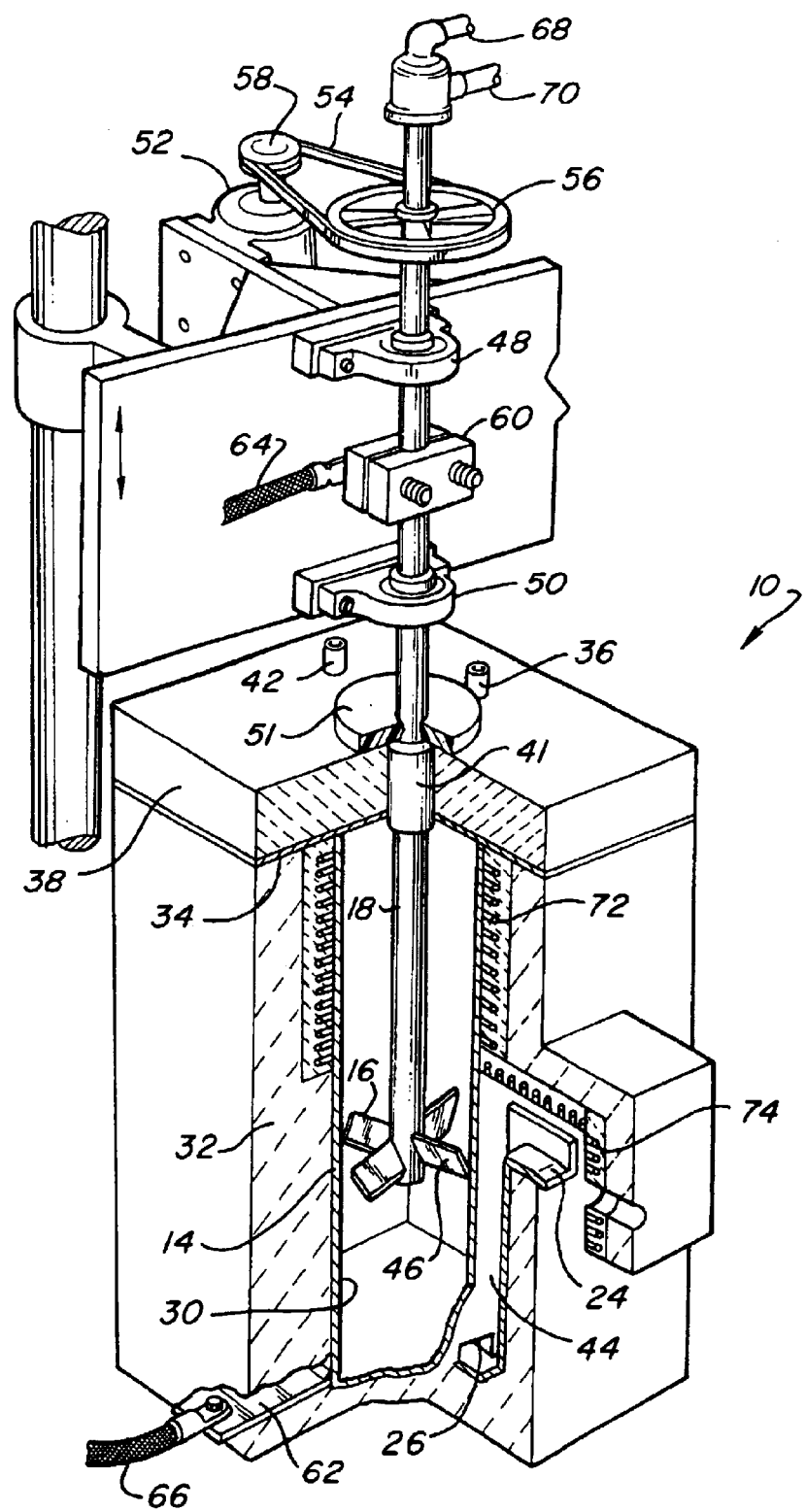
FIG. 2 is a fragmentary perspective view of the glass melter of the sent invention.

Referring now to FIGS. 1 and 2, the waste vitrification apparatus 10 will be described in greater detail. The vessel 14 is surrounded by walls 30. The walls 30 are formed of refractory bricks or other insulation material. An Inconel layer 34 is provided on top of the vessel 14. Layer 34 is also insulated by a refractory lid 38.

A shaft opening 40 is provided through the layer 34 and the refractory lid 38 which receives the drive shaft 18. An inlet 42 is provided in the layer 34 and lid 38 through which the aqueous feed stream 12 enters the vessel 14. An outlet 36 is also provided in the vessel 14 or layer 34 and lid 38 for release of gases and vapors from the melt 13. The gases and vapors released are further treated by appropriate means depending on their composition. An electrically non-conductive bushing 41 lines the hole 40 to prevent the drive shaft 18 from contacting or short circuiting to the layer 34.

An outlet passage 44 is provided between the opening 26 and spout 24. The outlet passage 44 is preferably located within the walls 30 and is maintained at an elevated temperature to keep the solidifiable output of the apparatus 10 in a molten state during its passage from the opening 26 to the spout 24.

The mixing impeller 16 preferably has blades 46 which are oriented approximately 45 degrees to set up an axial mixing flow within the mixing zone 20. A flow induced by the mixing impeller 16 is shown by arrows A in FIG. 1. The axial mixing flow fully disperses the constituents of the aqueous feed stream 12 upon entry into the glass melt 13. Other impeller designs can also be used to provided that adequate mixing of the feed stream in the glass melt occurs.

The location of the mixing impeller 16 within the vessel 14 is adjustable within a predetermined range. The adjustment of the location of the mixing impeller 16 changes the location of the mixing zone 20, and also allows expansion or contraction of the settling zone 22 to control the degree of densification of the solidifiable output of the apparatus 10. The drive shaft 18 is mounted on upper and lower insulative shaft mounts 48 and 50. Drive shaft 18 can be raised or lowered with the shaft mounts 48 and 50. A non-conductive mechanical seal 51 is preferably provided in the top 38 to seal the drive shaft 18. Arrows D illustrate the degree of displacement available within the predetermined range of adjustment of the mixing impeller 16 in the illustrated embodiment.

A drive motor 52 comprising a conventional electric motor is operatively connected to the drive shaft 18 by a drive belt 54. The drive belt 54 drives a shaft pulley 56 when rotated by a motor pulley 58.

The drive shaft 18 is preferably rotated at speeds to provide the intensive mixing required by the present invention. The mixing step of the present invention is different from prior art stirrers which at their outer perimeter rotate on the order of 50 feet per minute, or less, while the impeller 16 of the present invention is intended to rotate so that its outer perimeter moves at a speed of more than 250 feet per minute, and more preferably at more than 500 feet per minute.

The waste vitrification apparatus 10 electrically heats the glass melt 13 by electrical discharge through the melt 13 while in the vessel 14. A shaft electrical contact 60, preferably of the brush, or rotatable contact, type is connected to the drive shaft 18. The vessel 14 includes a vessel lead 62. A shaft cable 64 and vessel cable 66 are connected to the shaft electrical contact 60 and vessel lead 62, respectively, and are connected in an electrical circuit. The voltage and current must supply sufficient heat to convert the feed stream into a glass melt.

The drive shaft 18 is preferably a hollow shaft having coolant circulation. A cooling inlet 68 through which coolant water is introduced into a central tube of the drive shaft 18 and a coolant outlet 70 in communication with an outer tube portion of the drive shaft 18 is provided for flow of coolant fluid. Coolant fluid enters the coolant inlet 68 and exits the coolant outlet 70 after circulation through the drive shaft 18, preferably to a point below the layer 34 and above the level of the glass melt.

As shown in FIG. 2, auxiliary preheating coil 72 may be provided for preheating the apparatus 10. Auxiliary preheating coils are intended for initial start-up of the apparatus 10. After the process is operational, the auxiliary preheating coil 72 will be turned off as sufficient heat is developed.

Outlet heating coils 74 are provided to guard against any freeze-up of the outlet port 24. A gas burner could also be used for heating the outlet port 24 depending upon the type of waste being processed. Other auxiliary heaters, not shown, may be provided as needed to keep the opening 26 or base of the apparatus 10 above the melting temperature of the waste glass.

Figure 3:
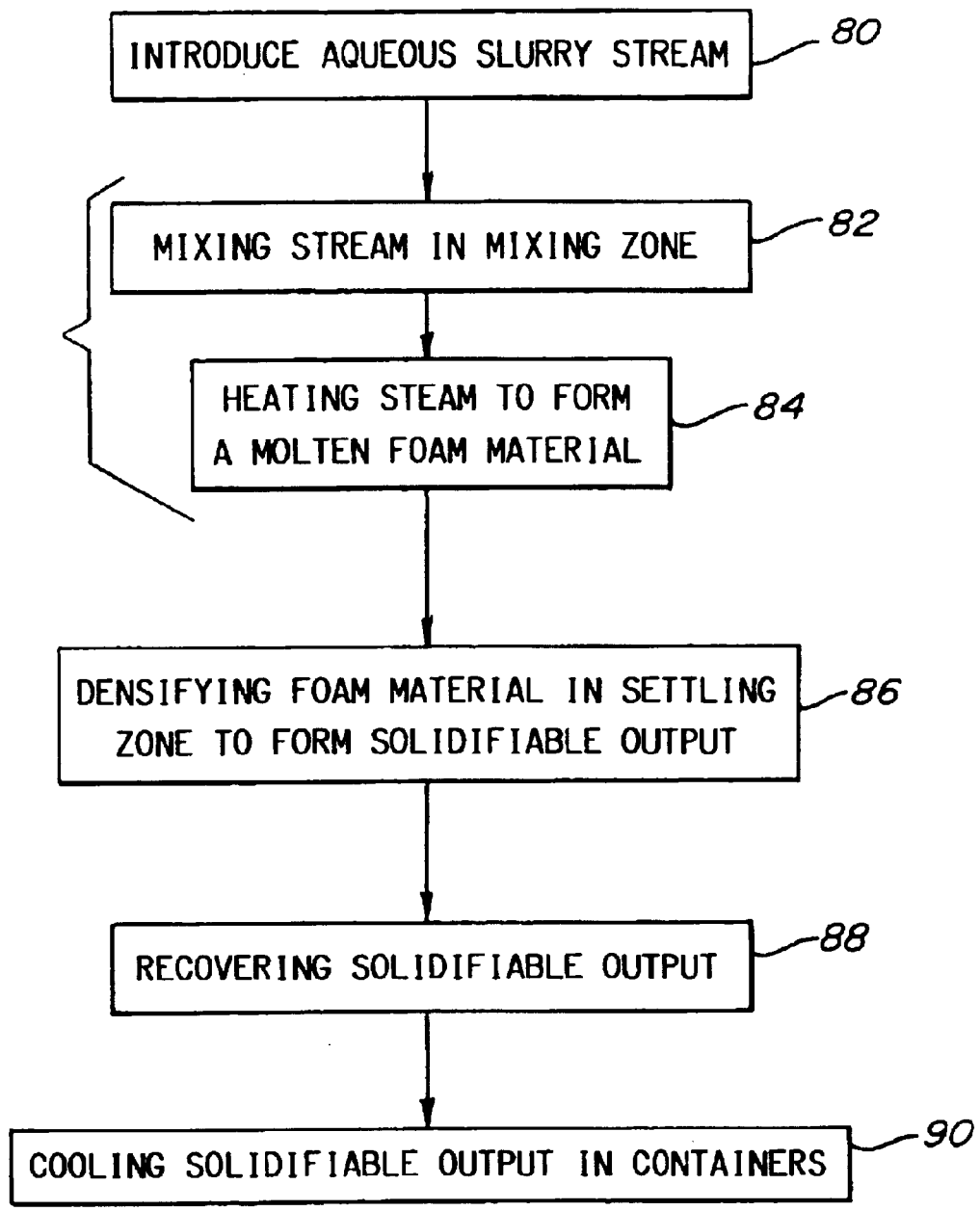
FIG. 3 is a flow chart schematically illustrating the steps of the method of the present invention.

Referring now to FIG. 3, the method of the present invention will be explained. The method commences with introduction of an feed stream at 80 into the apparatus 10.

As the feed stream is received in the vessel 14, it is mixed into the glass melt 13 in the mixing zone 20 by the impeller 16 as indicated by reference numeral 82. Preferably simultaneously, the glass melt 13 is heated at reference numeral 80 to form a molten foam material by the combined action of the electrical discharge between the walls of the vessel 14 and the impeller 16 and the rapid rotation of the impeller 16.

After mixing and heating, the foam material passes to a settling zone where a densifying step 86 is performed wherein the foam material is separated into a densified material and in gaseous constituents. The densified material preferably is densified to between 70 and 90 percent (or preferably more than 95 percent) of theoretical density of the waste glass. The deviation from theoretical density results from bubbles caused by the gaseous occlusions contained in the vitrified waste glass.

The densified material is then recovered from the vessel as a solidifiable output at reference numeral 88. The output is then poured into containers at reference numeral 90, and cooled to form a solidified vitrified mass, thereby permanently encasing the waste materials to preclude leaching of the waste materials from a storage facility.

The composition of the aqueous feed stream in a test run with non-radioactive materials to simulate radioactive wastes was nominally 60 percent water and 40 percent solids by weight. The solids content was approximately 28 percent particulate sludge, 8 percent dissolved solids and 64 percent boro-silicate rich glass frit.

The composition in percent by weight of a vitrified output sample of the test run is shown below as analyzed by two analysis methods:

| Constituent | Method A | Method B |
|---|---|---|
| CaO | 1.5 | 1.5 |
| CuO | 0.2 | 0.2 |
| MgO | 1.0 | 1.0 |
| MnO | 2.3 | 2.4 |
| ZnO | 0.1 | 0.1 |
| $Al_2O_3$ | 3.7 | 3.8 |
| $Fe_2O_3$ | 12.1 | 12.0 |
| $Li_2O$ | 3.9 | 3.7 |
| $Na_2O$ | 11.2 | — |
| NiO | 0.9 | 1.0 |
| $TiO_2$ | 0.8 | 0.8 |
| $K_2O$ | 1.7 | — |
| $SiO_2$ | 48.9 | — |
| $B_2O_3$ | 8.1 | — |
| SrO | — | 0.02 |
| $Cr_2O_3$ | — | 0.08 |
| $P_2O_5$ | — | 0.05 |

It is expected that actual radioactive waste glass would be of comparable composition but would also include radioactive materials.

The preceding description is of the best mode of practicing the invention. Modifications of the method and apparatus described will be apparent to those skilled in the art. The scope of the invention should be construed by reference of the following claims.

I claim:

1. A waste vitrification apparatus for vitrifying a feed stream having vitrifiable materials and waste materials comprising:
    a vessel at least partially formed of an electrically conductive material containing a glass melt and defining a mixing zone;
    a mixing impeller at least partially formed of an electrically conductive material;
    a drive shaft extending into said mixing zone of said vessel, said impeller being connected to said drive shaft;
    means for rotating the drive shaft and said impeller in said mixing zone to disperse the constituents of the feed stream into the glass melt;
    means for creating electrical current flow between the vessel and said impeller sufficient to heat the feed stream until the vitrifiable material melts to a liquid state forming a solidifiable output including the waste material and the melted vitrifiable material;
    a settling zone in fluid flow communication with the mixing zone; and
    an outlet opening through which said solidifiable output is ported for cooling and solidification.

2. The apparatus of claim 1 wherein said settling zone is provided in the same vessel containing said mixing zone.

3. The apparatus of claim 1 wherein said settling zone is provided in the same vessel as the mixing zone and is disposed below the mixing zone.

4. The apparatus of claim 1 wherein said settling zone is provided in a separate vessel from said vessel containing said mixing zone.

* * * * *